United States Patent [19]

Shearer, Sr. et al.

[11] 3,907,183

[45] Sept. 23, 1975

[54] BICYCLE-MOUNTED BASEBALL BAT AND BALL CARRIER

[76] Inventors: David Shearer, Sr., 131 Maplehurst Blvd.; David Shearer, 30 Eaton St., both of Battle Creek, Mich. 49017

[22] Filed: Aug. 9, 1973

[21] Appl. No.: 387,180

[52] U.S. Cl. .................................... 224/32; 224/39
[51] Int. Cl.² .......................................... B62J 11/00
[58] Field of Search ............ 224/39 R, 34, 30.36, 32, 224/37, 36, 45.11; 248/113, 74 R, 315; 294/19 R; 273/67 R

[56] References Cited
UNITED STATES PATENTS

| | | | |
|---|---|---|---|
| 613,226 | 11/1898 | Adams | 224/30 A |
| 1,625,856 | 4/1927 | Jadd | 224/45 L |
| 2,360,767 | 10/1944 | Elmquist | 224/39 R |
| 2,801,105 | 7/1957 | Acton | 224/45 L |
| 3,036,750 | 5/1962 | Lombardi | 224/45 L |

FOREIGN PATENTS OR APPLICATIONS

| | | | |
|---|---|---|---|
| 746,492 | 3/1933 | France | 224/45 L |
| 223,688 | 12/1942 | Switzerland | 224/39 R |
| 26,127 | 12/1898 | United Kingdom | 224/37 |

*Primary Examiner*—Robert J. Spar
*Assistant Examiner*—Kenneth Noland
*Attorney, Agent, or Firm*—Samuel Kurlandksy, Esq.

[57] ABSTRACT

A carrier for an elongate article such as a baseball bat adapted to be mounted on a bicycle, comprising a first supporting member formed of a frame member having an elastomeric sheet-form retaining member supported thereon, the retaining member having a central aperture adapted to receive and retain a portion of the baseball bat therein, and a second supporting member for engaging and supporting another portion of the baseball bat, and means for mounting the supporting members on the bicycle. In a further embodiment a ball-supporting member formed of a single piece of wire having at least two helically positioned turns adapted to engage the ball is provided having means for mounting the ball-supporting member on one of the bat-supporting members or on the bicycle frame itself.

9 Claims, 18 Drawing Figures

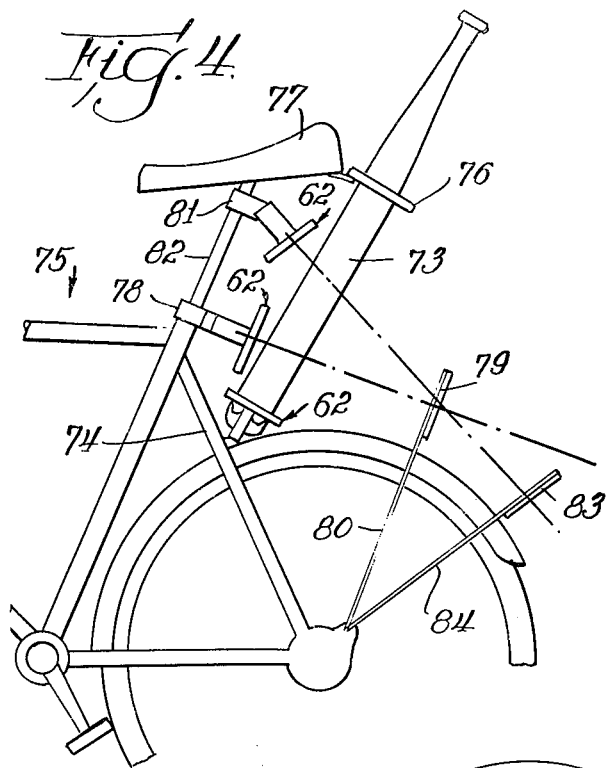
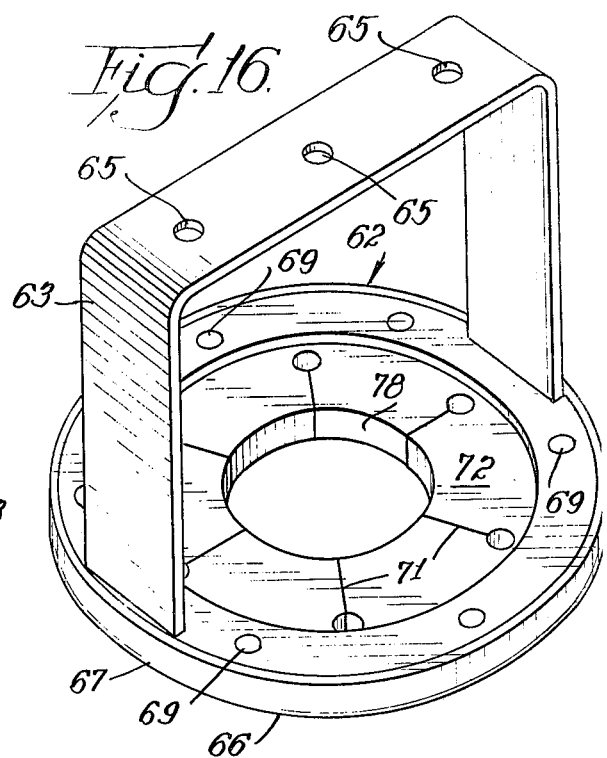
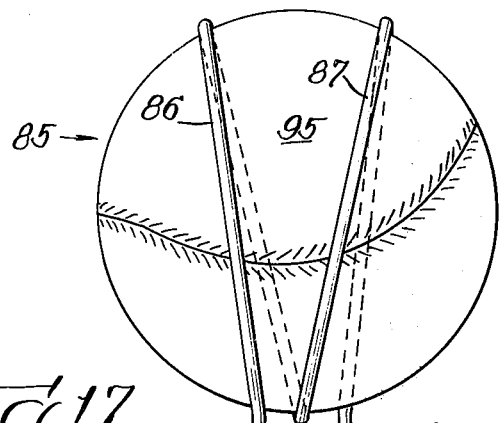
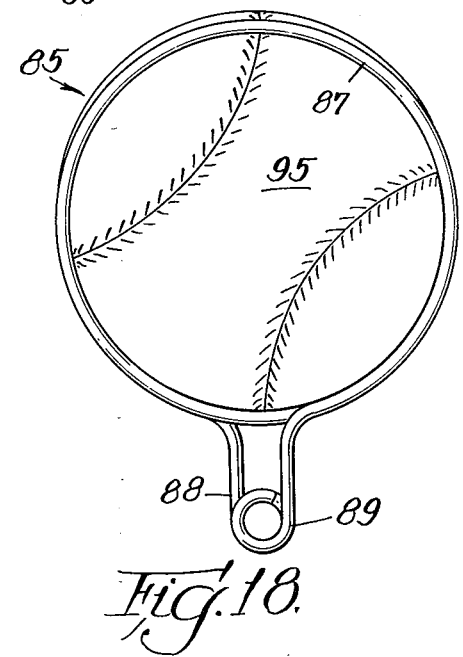
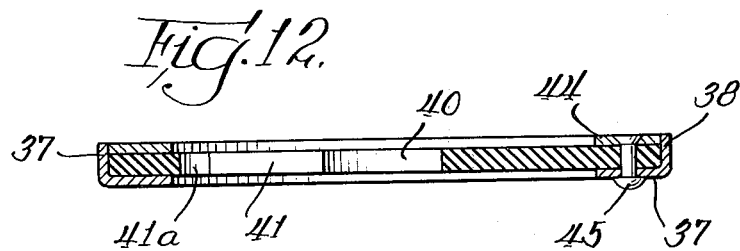

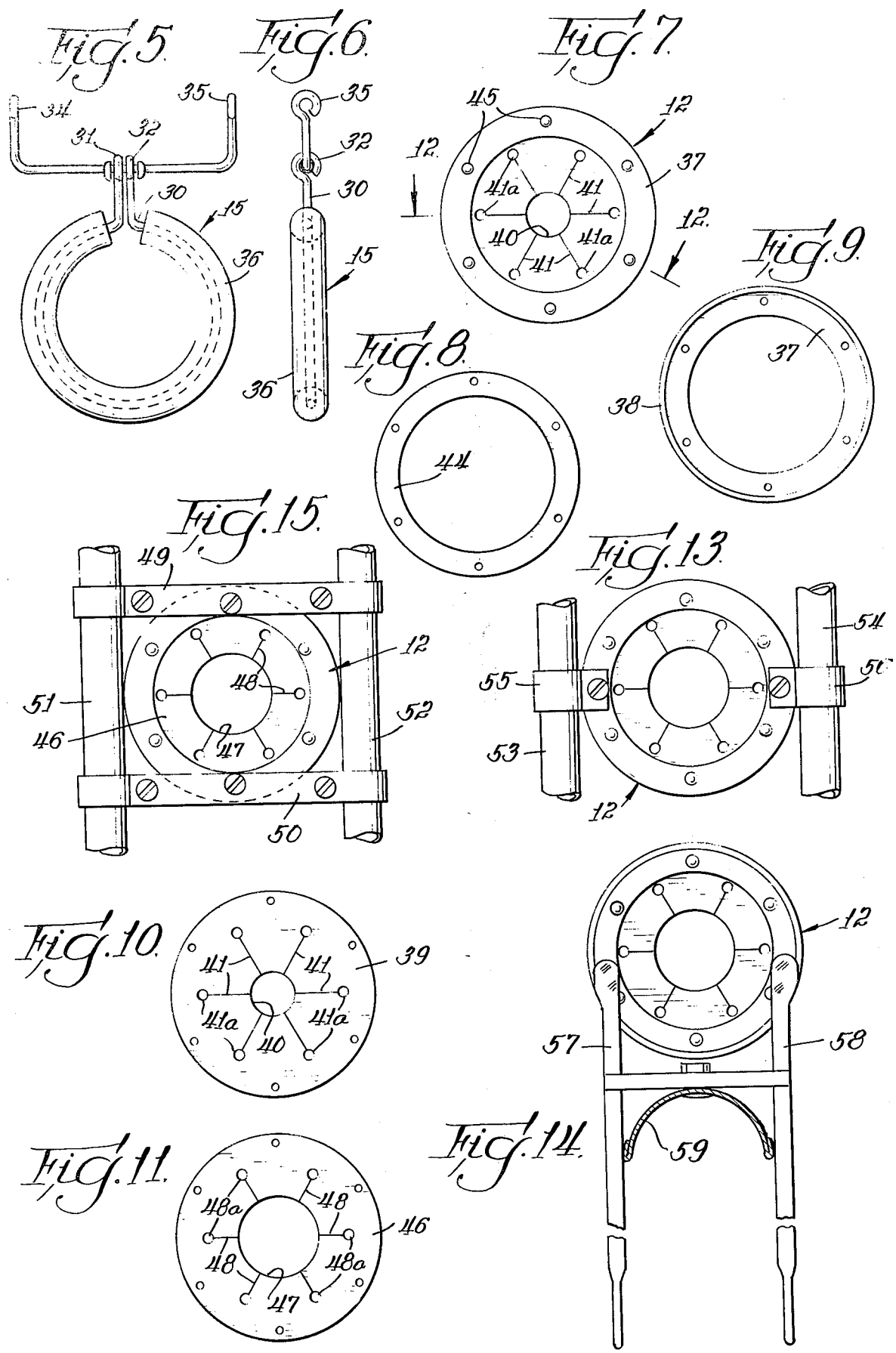

3,907,183

BICYCLE-MOUNTED BASEBALL BAT AND BALL CARRIER

BACKGROUND OF THE INVENTION

The present invention relates to carriers adapted to be mounted on bicycles and related vehicles, and more particularly refers to such carriers particularly adapted for supporting baseball bats and baseballs.

Baseball has become a favorite national sport and pastime for both young and old. It has become particularly popular among young people, witness the tremendous increase in the growing popularity of young people's baseball leagues such as Little League, Junior League, Pony League, etc. Because the playing fields are generally located at a considerable distance from the homes of the young players, the players almost invariably utilize bicycles for transportation to the playing field. As anyone who has ridden a bicycle knows, it is extremely difficult and even dangerous to ride a bicycle while trying to hold a baseball bat in one hand. For greatest safety, it is generally required that the bicycle rider use both hands to manipulate the bicycle. Riding while utilizing one hand to hold a bat is extremely dangerous and is responsible for numerous accidents. Moreover, there is a real danger that the baseball bat may get caught in the wheel spokes, resulting in the rider's being thrown off the bicycle. Standard carriers are sometimes utilized, but there is a tendency for the bat to bounce around and even bounce out of the carrier.

SUMMARY OF THE INVENTION

It is accordingly an object of the present invention to provide a device which may be mounted on the frame of a bicycle for carrying a baseball bat.

It is a further object to provide such a device which secures the baseball bat so that it cannot be thrown off by the up and down motions of the bicycle.

It is still an additional object to provide a carrier device into which a baseball bat may be readily placed.

It is another object to provide a carrier device which prevents the baseball bat from interfering with the operation of the bicycle.

It is another object to provide a carrier mounted on the bicycle for holding a baseball securely, and for permitting instant removal therefrom.

It is still another object to provide carriers of the type described which are relatively simple to produce and relatively inexpensive.

Still other objects will readily present themselves to one skilled in the art upon reference to the ensuing specification, the drawings, and the claims.

BRIEF DESCRIPTION OF THE DRAWINGS

FIG. 4 is an elevational view of the rear portion of another type of bicycle having a baseball bat carrier according to the invention mounted thereon.

FIG. 5 is a plan view of a secondary carrier member of the invention.

FIG. 6 is an end view of the device shown in FIG. 5.

FIG. 7 is a plan view of a primary carrying member according to the invention.

FIG. 8 is a plan view of an annular flange member for the device shown in FIG. 7.

FIG. 9 is a plan view of a complementary annular flange member.

FIG. 10 is a plan view of an elastomeric diaphragm utilized in the structure of FIG. 7.

FIG. 11 is a plan view of an elastomeric diaphragm for supporting the large end of a baseball bat.

FIG. 12 is a cross-sectional view showing the baseball bat retainer of the invention taken at the line 12—12 of FIG. 7, looking in the direction of the arrows.

FIG. 13 is a fragmentary elevational view showing the baseball bat retainer having a modified form of mounting.

FIG. 14 is a fragmentary elevational view showing the baseball bat retainer having still another form of mounting.

FIG. 15 is a fragmentary elevational view showing the baseball bat retaining member having a further modified form of mounting.

FIG. 16 is a perspective view of a bat retaining member according to the invention having a mounting bracket directly affixed thereto as shown in FIG. 4.

FIG. 17 is an elevational view showing a baseball retainer according to another embodiment of the invention, and having a baseball retained therein, and FIG. 18 is an elevational view of the structure and ball shown in FIG. 17 but rotated through a 90° angle.

DESCRIPTION OF THE PREFERRED EMBODIMENTS

Figure 1:
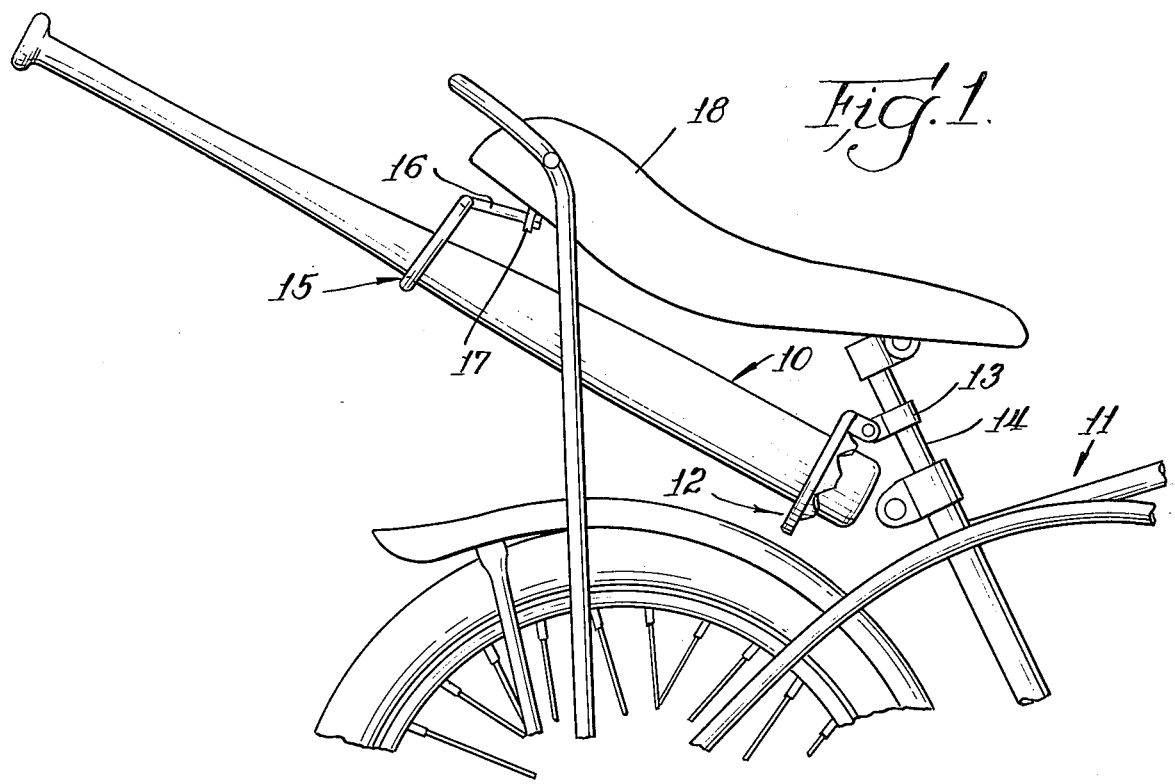
FIG. 1 is a fragmentary elevational view of a portion of a bicycle having a device according to the invention mounted on the bicycle and retaining a baseball bat.

Referring to FIG. 1, a baseball bat retaining member 10 according to the invention is shown mounted on a bicycle 11 comprising a primary bat retaining member 12 mounted by means of a bracket 13 to the seat post 14 of the bicycle, and a secondary bat retaining member 15 mounted by means of a bracket 16 to the bracket 17 of a bicycle seat 18.

Figure 2:
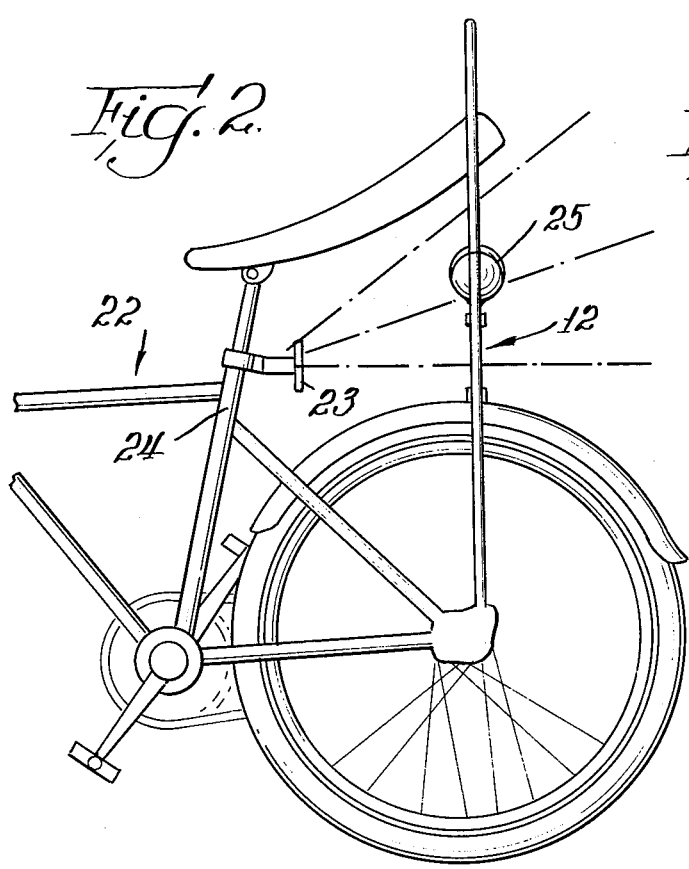
FIG. 2 is a somewhat modified embodiment of the baseball bat carrier showing how the carrier may be mounted in several different positions, and additionally illustrating a baseball carrier.
Figure 3:
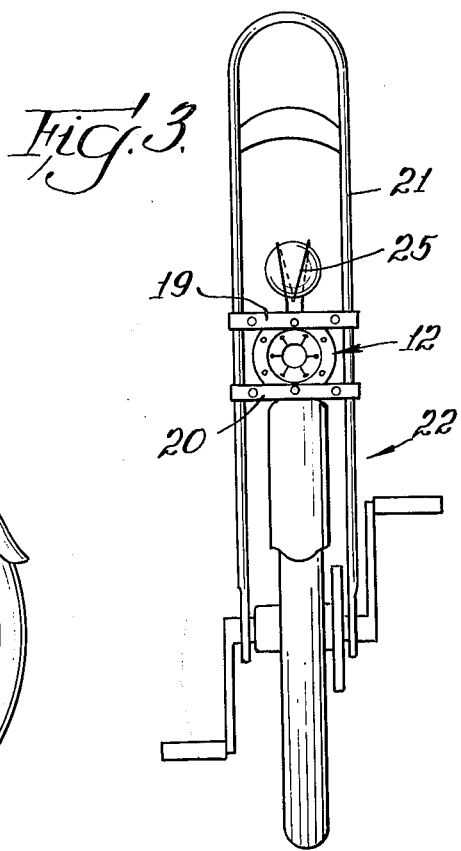
FIG. 3 is a rear elevational view of the device shown in FIG. 2.

Referring to FIGS. 2 and 3, a somewhat modified method of mounting the invention on a bicycle is shown. In this embodiment the primary bat retaining member 12, similar to that shown in FIG. 1, is mounted by means of two metal straps 19 and 20 by means of bolts, the straps being affixed to a seat supporting member 21 mounted on the bicycle 22. A secondary retaining member 23 is mounted on the seat support pillar 24 and may be ring-form, a wire clamping bracket, or any other type of suitable bracket. In FIG. 2, the broken lines radiating from the secondary retaining member 23 illustrate various positions in which a bat may be supported by moving the straps 19 and 20 upwardly. A baseball retainer 25 according to the invention is shown mounted to the strap 19.

Referring to FIGS. 5 and 6, a secondary bat retaining member 15 is shown, similar to that shown in FIG. 1, comprising a wire loop 30 having its ends shaped in the form of eyes 31 and 32 pivotally mounted on a U-form bracket 33 having eyes 34 and 35 at the ends thereof for mounting on a bicycle seat, as shown in FIG. 1. A flexible or elastomeric tube 36 is mounted over the loop 30 to prevent rattling or contact noise caused by the movement of the bat retained therein. The form of the secondary retaining member is not critical, as it serves primarily to suspend one end of the bat, the other end being firmly retained against axial and radial movement by the primary retaining member 12. The secondary retaining member may alternatively be in the form of a ring, spring clamps, strap-form clamps, or any of a number of other forms.

A fully assembled primary retaining member is shown in FIGS. 7 and 12, and the separate parts thereof illustrated in FIGS. 8–11. Referring to the drawings and particularly FIGS. 7–12, the structure comprises a first annular frame member 37 having an axially extending flange 38 (FIG. 9). Within the flange is mounted an elastomeric diaphragm 39 having a central aperture 40 with slits 41 provided therein to define a plurality of gripping finger 42. Apertures 41a may be provided at the radially outer ends of the slits 41 to permit freer movement of the fingers 42. A second flange 44 (FIG. 8) is mounted over the diaphragm and the entire structure is affixed together by bolts or rivets 45 inserted in apertures provided in both flanges and in the diaphragm periphery. The assembled bat retaining structure 49 is shown in cross-section in FIG. 12.

The diaphragm 39 shown in FIGS. 7 and 10 has a relatively small central aperture 40 designed to accept and retain the handle end of a bat. FIGS. 11, 13 and 14 illustrate a diaphragm 46 having a larger central aperture 47 and correspondingly shorter slits 48 with apertures 48a designed to accept and retain the large end of the bat. In each case the secondary retaining member is appropriately designed to receive the other end of the bat. Alternatively, a second primary bat retaining member may be utilized instead of the secondary retaining member, a diaphragm with a small aperture being used for the handle end and one with a larger aperture being used for the thick or club end.

The primary bat retaining member shown in FIGS. 7–12 may be mounted on the bicycle in any of numerous ways. As shown in FIG. 15, the primary retaining member 12 is mounted by means of straps 49 and 50 which are in turn affixed to the rear fender supporting braces 51 and 52. FIG. 13 illustrates the retaining member 12 mounted on seat supporting braces 53 and 54 by means of individual straps 55 and 56.

FIG. 14 illustrates a bat retaining member 12 mounted at the ends of fender braces 57 and 58 which in turn support a fender 59. Various other methods and structures for mounting the bat retaining member may be utilized.

Referring to FIG. 16, a primary bat retaining member 62 is shown having an integral mounting bracket 63 affixed to an annular frame member 64, and having apertures 65 provided in the bracket 63 for mounting. The retaining member 62 additionally comprises an annular frame member 66 having an axial flange 67. A sheet-form elastomeric diaphragm 68 is clamped between the frame members 64 and 66 and secured by rivets or bolts 69. A central aperture 70 is provided in the center of the diaphragm 68, and radial slits 71 are provided in the diaphragm to define a plurality of gripping fingers or flaps 72. Retaining members 62 such as shown in FIG. 15 are shown mounted on a bicycle in FIG. 4. In FIG. 4 the primary retaining member 62 is shown supporting the large end of a bat 73 and being mounted on a crossbar of a rear fork 74 of a bicycle 75. The smaller end of the bat is supported by means of a secondary retaining means in the form of a ring 76 affixed to the seat 77. In order to illustrate other means of mounting the bat retaining apparatus of the invention, FIG. 4 also illustrates a retaining member 62 mounted by means of a bracket 78 on the seat support of the bicycle, cooperating with a secondary bat support 79 mounted on a fender support 80. Additionally a retaining member 62 is shown mounted by means of a bracket 81 on the seat post 82. The retaining member 62 cooperates with a secondary retaining member 83 in the form of a loop such as that shown in FIGS. 5 and 6 and mounted on fender support 84. In any of the positions shown, the elastomeric diaphragm of the retaining member securely grips the bat so that it cannot slide out even when the bat is in a position lower than the retaining member. If desired, a second primary retaining member having an elastomeric diaphragm can be substituted for the ring-type of secondary retaining member.

Referring to FIGS. 16 and 17 a further structure according to the invention is shown comprising a baseball retaining member 85. The baseball retaining member 85 comprises a helical wire loop having two turns 86 and 87 spaced apart and having eyes 88 and 89 provided at the ends thereof mounted on a bolt 90 and nut 91 combination having a spacer 92 mounted thereon separating the loops 88 and 89, and retained by washers 93 and 94. The assembly may be mounted on a bicycle in any method available in the art, and may be mounted as shown in FIGS. 2 and 3 on the support for the primary bat retaining member. The diameter of the loops 86 and 87 should be smaller than the diameter of the baseball 95, so that the baseball may be securely held between the two loops.

The bat-carrying apparatus of the present invention has many advantages. It frees the hands of the operator and promotes safety for the bicycle rider. Both the primary and secondary retaining members are provided with brackets which can be mounted on virtually every type of bicycle. The elastomeric diaphragm securely retains the bat and prevents its shaking loose or rattling on the frame and holds the bat so securely that even if the bicycle is dropped to the ground the bat would still be retained. The diaphragm may be designed to receive either the large diameter end of the bat or the handle end. The bat is prevented from moving axially or rattling. The retaining members may be mounted on the seat, the seat post, or other portions of the frame of the bicycle. They may also be mounted on brackets which are normally provided to support reflectors. The annular frame members may be formed of a metal such as steel, aluminum, or zinc, or of a plastic material. The diaphragm may be formed of rubber, synthetic rubbers or elastomeric plastics such as polyvinyl chloride or polyurethane. The central aperture of the diaphragm may be made either large or small, depending on whether the large end or the handle end of the bat is to be inserted therein. The annular frame members can be affixed together by means of bolts, rivets, or plastic rods which may be molded at one end integral with the supporting member and heated at the other to enlarge the end for engaging the other frame member. If a plastic material is used, a high impact plastic should be used from among those commonly available in the art. The ball carrier may be formed preferably of wire having sufficient resilience to permit spreading apart for inserting the ball, and for retaining the ball after it is inserted between the two loops.

It is to be understood that the invention is not to be limited to the exact details of operation or structures shown and described, as obvious modifications and equivalents will be apparent to one skilled in the art.

We claim:

1. A baseball bat carrier for mounting on a bicycle, comprising:
   1. a primary supporting member for engaging one end of the baseball bat having:
      a. means defining a peripheral frame, comprising a pair of superposed separate annular flanges,
      b. a sheet of an elastomeric material supported at its periphery by said frame, having a central aperture adapted to engage and retain one end of said bat, the size of the aperture being smaller than the end of the bat to be retained, the periphery of said elastomeric sheet disposed between said flanges and means clamping said flanges together to retain the periphery of said elastomeric sheet therebetween, and
      c. a bracket affixed to said frame and adapted to be mounted on said bicycle, and
   2. a secondary supporting member adapted to support the other end of the bat, and means for mounting said secondary supporting member on said bicycle.

2. A carrier according to claim 1, wherein radial slits are provided in said sheet of elastomeric material extending from said aperture radially outwardly to define gripping fingers for engaging said baseball bat.

3. A carrier according to claim 2, wherein enlarged apertures are provided at the outer ends of said radial slits to facilitate bending of the fingers formed by said slits.

4. A carrier according to claim 1, wherein one of said flanges is provided with an axial flange extension and the other of said annular flanges is mounted within said axial flange extension.

5. A carrier according to claim 1, wherein said secondary member comprises a wire loop having a tubular cushioning member mounted thereon.

6. A carrier according to claim 1, wherein said secondary supporting member comprises a spring-loaded wire clamp.

7. A carrier according to claim 1, wherein the mounting bracket means for said primary supporting means is a strap-form piece of metal affixed to one edge of said peripheral frame and having the ends thereof adapted to be mounted on said bicycle.

8. A carrier according to claim 1, wherein said mounting bracket means for said primary supporting member comprises a pair of metal straps in parallel spaced-apart arrangement, each affixed to said frame and having their ends adapted to be affixed to said bicycle.

9. A carrier acccording to claim 1, having a ball holder mounted thereon for retaining a ball therein, comprising a unitary wire-form structure in the form of a two-turn helix and means at the end thereof mounting said ball holder on said carrier, the diameter of said turns being smaller than that of said ball, whereby said ball may be inserted between said wire turns and securely retained therebetween.

* * * * *